United States Patent [19]

Nesheiwat et al.

[11] Patent Number: 5,134,224
[45] Date of Patent: Jul. 28, 1992

[54] AROMATIC SULFIDE/SULFONE POLYMER PRODUCTION

[75] Inventors: Afif M. Nesheiwat, Madison, N.J.; Lacey E. Scoggins, Bartlesville, Okla.; Melvin D. Herd, Idaho Falls, Id.

[73] Assignee: Phillips Petroleum Company, Bartlesville, Okla.

[21] Appl. No.: 654,983

[22] Filed: Feb. 14, 1991

[51] Int. Cl.$^5$ ............................................. C08G 75/16
[52] U.S. Cl. ...................................... 528/388; 528/171; 528/174
[58] Field of Search ................... 528/388, 171, 174

[56] References Cited

U.S. PATENT DOCUMENTS

| | | | |
|---|---|---|---|
| 4,016,145 | 4/1977 | Campbell | 260/79.3 |
| 4,102,875 | 7/1978 | Campbell | 528/388 |
| 4,127,713 | 11/1978 | Campbell | 528/391 |
| 4,301,274 | 11/1981 | Campbell | 528/388 |
| 4,631,336 | 12/1986 | Idel et al. | 528/388 |
| 4,661,584 | 4/1987 | Idel et al. | 528/388 |

FOREIGN PATENT DOCUMENTS 3428985 8/1984 Fed. Rep. of Germany.

*Primary Examiner*—Arnold D. Anderson
*Attorney, Agent, or Firm*—Richmond, Phillips, Hitchcock & Carver

[57] ABSTRACT

According to this invention, improved results in terms of molecular weight and percent yield of aromatic sulfide/sulfone polymers are achieved by the employment of a low level modifying agent within a specific range in the polymerization reaction mixture. The modifying agent employed is a salt of an amino carboxylic acid. The salt can be employed as an already existing salt of an amino carboxylic acid or can be formed in situ by employing either an amino carboxylic acid and a base; or a lactam and a base.

18 Claims, 1 Drawing Sheet 5,134,224

AROMATIC SULFIDE/SULFONE POLYMER PRODUCTION

FIELD OF THE INVENTION

This invention relates to the production of aromatic sulfide/sulfone polymers.

BACKGROUND OF THE INVENTION

Thermoplastic polymers having a high degree of heat resistance or thermal stability are the object of intensive research and development in many laboratories throughout the world. Since thermoplastic materials comprising these polymers can be molded rapidly and efficiently to articles of simple or complex design, mass production techniques can be utilized to provide a wide variety of useful products. Heat resistant thermoplastic polymers thus offer important advantages that can be used in applications such as electrical components, wire coatings, automotive parts, aircraft parts and the like. Often such polymers can be used in the form of composite materials which contain high temperature resistant fibers and fillers.

Arylene sulfide/sulfone polymers are thermoplastic polymers known in the art, and processes for making these polymers are disclosed in various U.S. patents of R. W. Campbell, e.g. U.S. Pat. Nos. 4,016,145, 4,102,875, 4,127,713 and 4,301,274. Although these patents represent significant and valuable advances in the art, there is a need for a simplified process which can provide aromatic sulfide/sulfone polymers having high molecular weight. Further, there is a continuing need to discover methods which improve polymer yield while maintaining the high molecular weight of the polymer.

SUMMARY OF THE INVENTION

It is, therefore, an object of this invention to produce aromatic sulfide/sulfone polymers exhibiting high molecular weight.

It is a further object of this invention to provide a simplified, readily controllable process for producing high molecular weight aromatic sulfide/sulfone polymers.

It is still a further object of this invention to provide a high yield process for producing high molecular weight aromatic sulfide/sulfone polymers.

Other objects and aspects, as well as the several advantages of this invention are apparent from a study of this disclosure and the appended claims.

According to this invention, improved results in terms of molecular weight and percent yield of aromatic sulfide/sulfone polymers are achieved by the employment of a low level modifying agent within a specific range in the polymerization reaction mixture. The modifying agent employed is a salt of an amino carboxylic acid, where the salt can be employed as an already existing salt of an amino carboxylic acid or can be formed in situ by employing either an amino carboxylic acid and a base; or a lactam and a base. In accordance with the invention, the process discovered to produce aromatic sulfide/sulfone polymers comprises forming a polymerization mixture comprising:

(a) at least one dihaloaromatic sulfone;
(b) at least one organic amide;
(c) at least one sulfur-containing compound;
(d) at least one salt of an amino carboxylic acid, wherein said salt of an amino carboxylic acid is present in an amount having a molar ratio of said salt of an amino carboxylic acid to said sulfur containing compound from about 0.001:1 to about 0.04:1; and
(e) water, and subjecting said polymerization mixture to polymerization conditions sufficient to produce an aromatic sulfide/sulfone polymer.

DETAILED DESCRIPTION OF THE INVENTION

Figure 1:
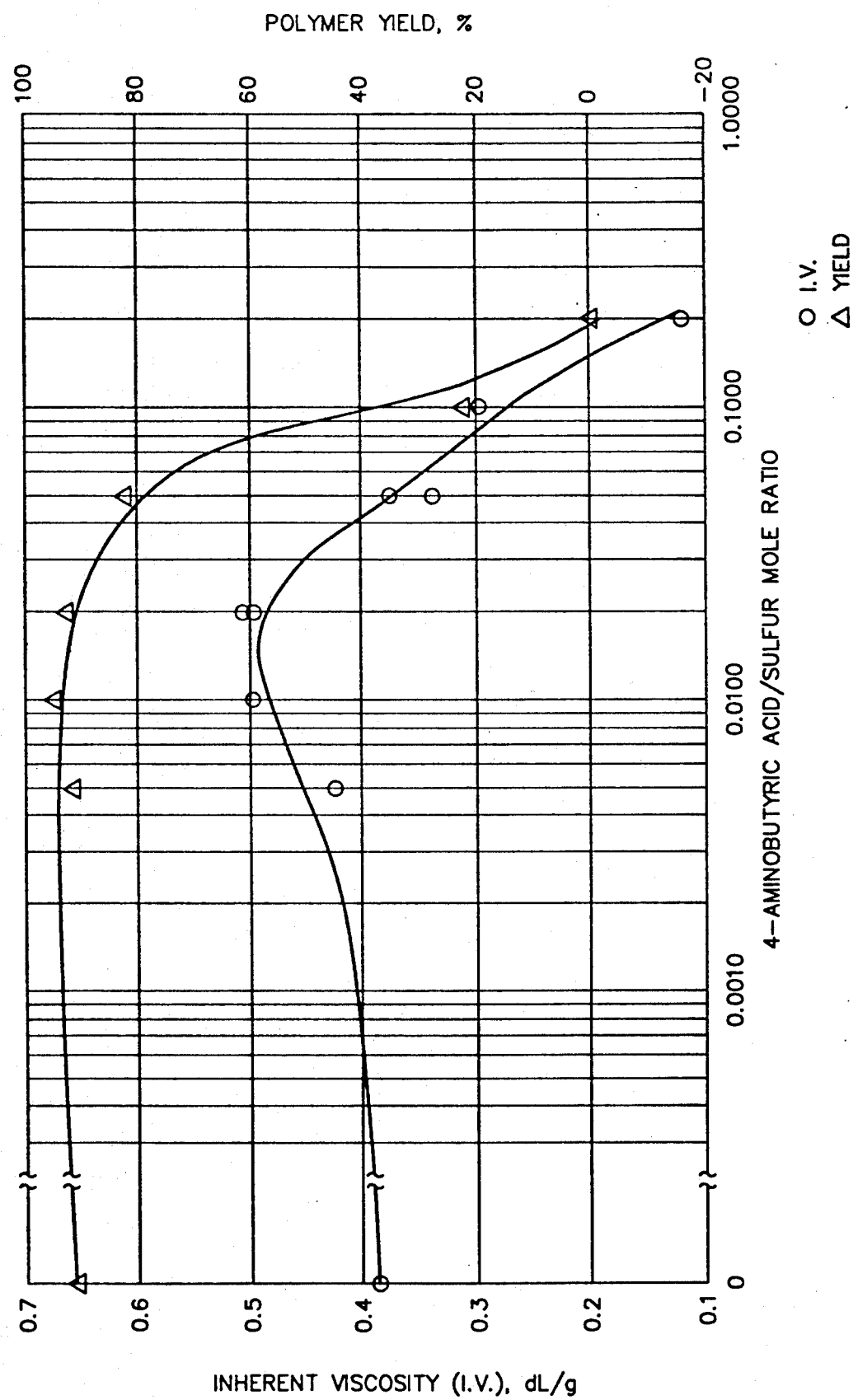
FIG. 1 presents a plot of poly(phenylene sulfide/sulfone) ("PPSS") polymer inherent viscosity (I.V.) and percent yield as a function of the level of modifying agent employed in the polymerization. A change from linear to log scale occurs in the drawing such that a polymer prepared with no modifying agent can be compared with polymers prepared with differing amounts of modifying agent present.

According to the invention, a polymerization reaction mixture comprising at least one dihaloaromatic sulfone, at least one organic amide, at least one sulfur containing compound, a low level modifying agent, and water is exposed to polymerization conditions of time and temperature sufficient to produce an aromatic sulfide/sulfone polymer.

The dihaloaromatic sulfones employed in the process of this invention can be represented by the formula:

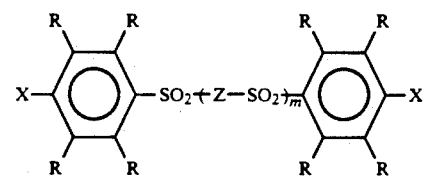

wherein each X is selected from the group consisting of fluorine, chlorine, bromine, or iodine; Z is a divalent radical selected from the group consisting of

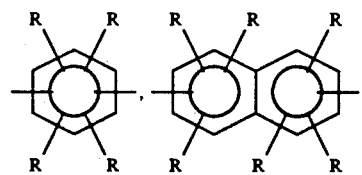

and

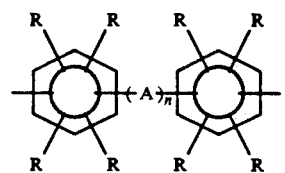

m is 0 or 1; n is 0 or 1; A is selected from the group consisting of oxygen, sulfur, sulfonyl, and $CR_2$; and each R is selected from the group consisting of hydrogen and alkyl radicals having one to about 4 carbon atoms, the total number of carbon atoms in all of the R groups in the molecules being 0 to about 12. Preferably, m is 0 and said dihaloaromatic sulfone is represented by the formula:

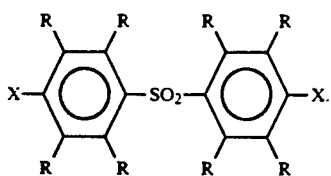

Examples of some dihaloaromatic sulfones that can be employed in the process of the invention include bis(p-fluorophenyl)sulfone, bis(p-chlorophenyl)sulfone, bis(p-bromophenyl)sulfone, bis(p-iodophenyl)sulfone, p-chlorophenyl p-bromophenyl sulfone, p-iodophenyl 3-methyl-4-fluorophenyl sulfone, bis(2-methyl-4-chlorophenyl)sulfone, bis(2,5-diethyl-4-bromophenyl)sulfone, bis(3-isopropyl-4-iodophenyl)sulfone, bis(2,5-dipropyl-4-chlorophenyl)sulfone, bis(2-butyl-4-fluorophenyl)sulfone, bis(2,3,5,6-tetramethyl-4-chlorophenyl)sulfone, 2-isobutyl-4-chlorophenyl 3-butyl-4-bromophenyl sulfone, 1,4-bis(p-chlorophenylsulfonyl)benzene, 1-methyl-2,4-bis(p-fluorophenylsulfonyl)benzene, 2,6-bis(p-bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenyl]ether, bis[p-(p-chlorophenylsulfonyl)phenyl]sulfone, bis[p-(p-chlorophenylsulfonyl)phenyl] sulfide, bis[p-(p-bromophenylsulfonyl)phenyl]methane, 5,5-bis[3-ethyl-4(p-chlorophenylsulfonyl)phenyl]nonane, and the like, and mixtures thereof. Bis(p-chlorophenyl)sulfone is preferred for reasons of availability and generally good results.

The amount of dihaloaromatic sulfone employed in this invention can vary widely. Generally good results are obtained with a molar ratio of dihaloaromatic sulfone to sulfur-containing compound of about 0.7:1 to about 1.3:1. Preferably this molar ratio is about 0.9:1 to about 1.15:1.

The organic amides used in this invention should be substantially liquid at the reaction temperature and pressure employed. The amides can be cyclic or acyclic and can have one to about ten carbon atoms per molecule. Examples of some suitable amides include formamide, acetamide, N-methylformamide, N,N-dimethylformamide, N,N-dimethylacetamide, N-ethylpropionamide, N,N-dipropylbutyramide, N-methyl-2-pyrrolidone, N-methyl-ε-caprolactam, N-ethyl-2-pyrrolidone, N-cyclohexyl-2-pyrrolidone, N-dodecyl-3-octyl-2-pyrrolidone, N,N'-ethylenedi-2-pyrrolidone, hexamethylphosphoramide, tetramethylurea, and the like, and mixtures thereof.

The molar ratio of organic amide to sulfur-containing compound utilized in this invention can vary broadly from about 2:1 to about 24:1, preferably about 4:1 to about 16:1. When utilizing these organic amide ratios, the water component is best employed at a molar ratio of organic amide to water within the range from about 0.4:1 to about 1.3:1, preferably about 0.5:1 to about 1:1.

The sulfur-containing compound utilized in the invention is selected from the group consisting of alkali metal sulfides and alkali metal hydrosulfides. Suitable alkali metal sulfides include lithium sulfide, sodium sulfide, potassium sulfide, rubidium sulfide, and cesium sulfide. Suitable alkali metal hydrosulfides include lithium hydrosulfide, sodium hydrosulfide, potassium hydrosulfide, rubidium hydrosulfide, and cesium hydrosulfide. The more preferred sulfur-containing compound is prepared from an alkali metal hydrosulfide and an alkali metal hydroxide. The preferred alkali metal hydrosulfide, due to its effectiveness and availability, is sodium hydrosulfide (NaSH). The preferred alkali metal hydroxide, due to its effectiveness and availability is sodium hydroxide (NaOH).

The alkali metal sulfides and alkali metal hydrosulfides can be conveniently utilized according to the invention as an aqueous solution or dispersion of these components. For example, an aqueous solution of sodium hydrosulfide is convenient to use.

The salt of an amino carboxylic acid, which is employed as a modifying agent in this invention, can be employed as an already existing salt of an amino carboxylic acid; formed in situ by combining a lactam and a base component; or formed in situ by combining an amino carboxylic acid and a base component.

If employed as an already existing salt of an amino carboxylic acid, the compound can be represented by the formula $H_2N-R'-CO_2-X'$, where $R'$ can be either a cyclic or acyclic alkylidene having 1 to 21 carbon atoms and $X'$ can be selected from the group consisting of lithium, sodium, potassium, rubidium, or cesium. Examples of the amino carboxylic acid component of an already existing salt of an amino carboxylic acid that can be employed in this invention include 2-aminoacetic acid, 3-aminopropionic acid, 4-aminobutyric acid, 3-aminobutyric acid, 6-aminohexanoic acid, 12-aminododecanoic acid, 8-aminododecanoic acid, 16-aminopalmitic acid, 18-aminostearic acid, 4-aminocyclohexanecarboxylic acid, 3-aminocyclohexanecarboxylic acid, 4-aminocyclooctanecarboxylic acid, 3-aminocyclohexadecanecarboxylic acid, and the like, and mixtures thereof. Currently, the most preferred salt of an existing amino carboxylic acid is sodium 4-aminobuturate.

When an already existing salt of an amino carboxylic acid is employed as the modifying agent in this invention, preferably it is employed in a molar ratio of salt of an amino carboxylic acid to sulfur-containing compound within a range from about 0.001:1 to about 0.04:1, more preferably from 0.004:1 to 0.03:1, and most preferably from 0.008:1 to 0.03:1.

When the salt of an amino carboxylic acid is formed in situ in the polymerization mixture by combining an amino carboxylic acid and a base component, amino carboxylic acids that can be employed are represented by the formula $H_2N-R''-CO_2H$, where $R''$ can be either a cyclic or acyclic alkylidene having 1 to 21 carbon atoms. The salt of the selected amino carboxylic acid is formed in situ by a neutralization reaction where the amino carboxylic acid is neutralized by the base component. Suitable amino carboxylic acids that can be combined with the base component include 2-aminoacetic acid, 3-aminopropionic acid, 4-aminobutyric acid, 3-aminobutyric acid, 6-aminohexanoic acid, 12-aminododecanoic acid, 8-aminododecanoic acid, 16-aminopalmitic acid, 18-aminostearic acid, 4-aminocyclohexane carboxylic acid, 3-aminocyclohexanecarboxylic acid, 4-aminocyclooctanecarboxylic acid, 3-aminocyclohexadecanecarboxylic acid, and the like, and mixtures thereof. Preferably 4-aminobutyric acid is employed.

When the amino carboxylic acid is combined with a base component to form the salt of an amino carboxylic acid in situ, preferably the amino carboxylic acid is employed in a molar ratio of amino carboxylic acid to sulfur-containing compound within a range from about 0.001:1 to about 0.04:1, more preferably from 0.004:1 to 0.03:1, and most preferably from 0.008:1 to 0.03:1.

When the salt of an amino carboxylic acid is formed in situ by combining an amino carboxylic acid with a base component, the base component can be selected from an alkali metal hydroxide, an alkali metal carbonate, or mixtures thereof. The alkali metal component of the hydroxide or carbonate can be selected from the group consisting of sodium, lithium, potassium, rubidium, or cesium. For example, sodium hydroxide, sodium carbonate, lithium hydroxide, lithium carbonate, potassium hydroxide, potassium carbonate, rubidium hydroxide, rubidium carbonate, cesium hydroxide, cesium carbonate, and the like, and mixtures thereof may be employed. More preferably the base component is selected from sodium hydroxide, sodium carbonate, or a mixture thereof. Most preferably the base component is sodium carbonate.

The amount of the total base component employed for both the polymerization and the in situ neutralization when an amino carboxylic acid is employed is preferably in a molar ratio of base to sulfur containing compound from about 0.5:1 to 2:1, more preferably from 0.75:1 to 1.25:1, and most preferably from 0.9:1 to 1.1:1.

When the salt of an amino carboxylic acid is formed in situ by combining a lactam with a base component in the polymerization mixture, suitable lactams can be represented by the formula

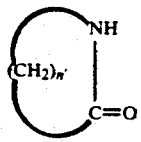

where n' is from 1 to 10. The salt of an amino acid is formed in situ by a neutralization reaction where the lactam is neutralized by the base component. Examples of some lactams that may be used in this invention include azacyclobutan-2-one, 2-pyrrolidone, ε-caprolactam, azacycloheptane-2-one, azacyclooctan-2-one, azacyclodecan-2-one, and the like, and mixtures thereof. Preferably 2-pyrrolidone or ε-caprolactam is employed. Currently most preferred is 2-pyrrolidone.

When a lactam is employed with a base component to form salt of an amino carboxylic acid in situ, preferably the lactam is employed in a molar ratio of lactam to sulfur-containing compound within a range from about 0.001:1 to about 0.04:1, more preferably from 0.004:1 to 0.03:1, and most preferably from 0.008:1 to 0.03:1.

The neutralization of the lactam by a base to form the salt of an amino carboxylic acid in situ requires a stronger base than the neutralization of an amino carboxylic acid. For this reason, it is preferred that either an alkali metal hydroxide alone or a mixture of alkali metal hydroxide and alkali metal carbonate be employed as the base component to neutralize the lactam. The alkali metal component of either the hydroxide or carbonate can be selected from sodium, lithium, potassium, rubidium, cesium, and mixtures thereof. When a mixture of alkali metal carbonate and alkali metal hydroxide is employed, a molar ratio of alkali metal hydroxide to alkali metal carbonate should fall within a range from about 20:80 to about 99:1. More preferably when said basic mixture is employed, the mixture of the alkali metal hydroxide and alkali metal carbonate is sodium hydroxide and sodium carbonate with a molar ratio of sodium hydroxide to sodium carbonate is from 60:40 to 99:1. Most preferably sodium hydroxide is employed alone as the base to neutralize the lactam.

The amount of total base component employed for both the polymerization and the in situ neutralization when a lactam is employed is preferably in a molar ratio of base to sulfur containing compound from about 0.5:1 to 2:1, more preferably from 0.75:1 to 1.25:1, and most preferably from 0.9:1 to 1.1:1.

The invention can be carried out by charging the various polymerization reaction mixture components in any order. Whether the inventive modifying agent is employed as an already existing salt of an amino carboxylic acid; formed in situ by combining a carboxyic acid with a base; or formed in situ by combining a lactam with a base, the modifying agent may be combined with the polymerization reagents prior to polymerization or at the onset of polymerization. The modifying agent must be present during the polymerization to be effective. Preferably, if the modifying agent is formed in situ, the base component is combined with either the carboxylic acid or the lactam prior to the polymerization so that neutralization can occur during the heat up of the polymerization reactants to the reaction temperature.

The reaction conditions must be sufficient to produce aromatic sulfide/sulfone polymers. Although the reaction temperature at which polymerization is conducted can vary over a considerable range, generally it will be within the range from about 140° C. to about 240° C., preferably from about 185° C. to about 225° C. The reaction time can vary widely, depending in part on the reaction temperature employed, but generally will be within the range of about 10 minutes to about 72 hours, preferably about 1 hour to about 4 hours. The pressure should be sufficient to maintain the dihaloaromatic sulfone and other organic compounds present substantially in a liquid phase.

The aromatic sulfide/sulfone polymers as produced by the process of our invention are in particle form and can be separated from the reaction mixture by conventional procedures, e.g. by filtration of the reaction mixture to recover the polymer followed by washing at least once with water. A presently preferred recovery method involves diluting the hot reaction mixture with a mixture of water and organic amide, or optionally water alone, and cooling the quenched mixture with stirring. The separated polymer particles can then be washed with water preferably with at least a portion of the washing being conducted at an elevated temperature within the range of about 130° C. to about 250° C. Preferably the polymer provided is low in ash-forming substances and is relatively light in color as well as exhibiting good melt flow stability under conditions of melt processing operations such as injection molding. In addition, it is presently preferred to employ a zinc carboxylate salt in the treatment of the recovered aromatic sulfide/sulfone polymer in at least one of the above-described wash steps.

The aromatic sulfide/sulfone polymers produced by the process of the invention can be blended with fillers, fibers, pigments, extenders, other polymers, and the like. The inventive aromatic sulfide/sulfone polymers are useful in the production of coatings, film, molded objects, and fibers. The polymers exhibit a good balance of properties for these uses, with the heat deflection temperature being particularly outstanding.

The examples following should be taken as exemplary and not exclusive in illustrating this invention.

EXAMPLES

In the following examples, aromatic sulfide/sulfone polymers were produced, and the inherent viscosities (I.V.) of the polymers were determined in accordance with the procedure described in ASTMD 2857-87, with conditions including a temperature at 30° C. with a solids concentration of 0.25 g in 50 milliliters (mL) of N-methyl-2-pyrrolidone (NMP). The I.V. units are deciliters per gram (dL/g). The aromatic sulfide/sulfone polymers produced were all polyphenylene sulfide/sulfone (PPSS) polymers.

EXAMPLE I

This example is a control run demonstrating a poly(phenylene sulfide/sulfone (PPSS) polymerization in the absence of the lactam or amino acid modifiers of the present invention. To a stirred, 3.8-liter autoclave was charged 1.0 g-mol of sodium hydrosulfide (NaSH) as a 60.15 weight percent aqueous solution, 1.0 g-mol of sodium hydroxide, 1.0 g-mol of bis(p-chlorophenyl)sulfone (BCPS), 5 g-mol deionized water, and 8 g-mol NMP. The autoclave was sealed, purged with nitrogen with stirring, heated to 200° C., and held for three hours at 200° C. The heat was terminated and 500 mL NMP and 200 mL deionized water were added to the autoclave.

After the autoclave was cooled and opened, a slurry of particles in a liquid was removed from the autoclave. Filtration of the slurry on a 100 mesh screen gave a granular PPSS product, which was then washed with deionized water and rinsed with acetone. After the granular product was dried in a vacuum oven, 224.3 g of polymer (90 mole percent yield) was obtained with an inherent viscosity (I.V.) of 0.41 and 0.40 dL/g in duplicate determinations.

Sixty g of the above-described polymer and 550 g water were added to a one-liter reactor. The reactor was sealed, purged with nitrogen while stirring, heated to 180° C., and held at 180° C. for 0.5 hour. The reactor was then opened and the liquid drawn off. Thereafter the polymer was washed in the reactor by adding to the reactor 550 g water and 10 g zinc acetate. After the reactor was purged with nitrogen with stirring, it was heated to 180° C., and held at 180° C. for 0.5 hour. The reactor was cooled and the slurry from the reactor was filtered, rinsed with acetone, and dried in a vacuum oven. The resulting polymer had an I.V. of 0.39 dL/g and appears in TABLE I as Polymer 1.

EXAMPLE II

A series of PPSS polymerizations were carried out in a manner similar to the procedure described in Example I except that varying amounts of 4-aminobutyric acid (4-ABA), an amino carboxylic acid, were added, and the amount of NaOH employed was increased to provide additional base for purposes of neutralizing the 4-ABA while still leaving a constant 1.0 mole of base for the polymerization.

The results of the polymerizations are summarized in TABLE I. Polymer 1, the control described in Example I, is included in the Table for purposes of comparison. The table contains the inherent viscosity (I.V.) of each polymer after the initial recovery and after the zinc acetate treatment. Inventive runs 2 through 5 show that the presence of 4-aminobutyric acid in the polymerization gave desirably higher I.V. values (higher molecular weights) and higher yields than the control, Polymer 1, or runs with higher levels of 4-ABA. Product yields as high as 95 percent were observed.

Polymerization runs 4 and 5 were duplicate runs using 0.02 moles of 4-ABA and 1.02 moles of base. These two runs show very good reproducibility of the polymerizations and substantial increases in I.V. over the control run. Since runs 8 and 9 gave low yields and I.V. levels, zinc acetate treatments were not carried out.

FIG. 1 presents a plot of the polymer I.V. and yield as a function of the level of 4-aminobutyric acid employed in the polymerization, as shown in TABLE 1. Within the range of about 0.001 and 0.03 moles of 4-ABA per mole of the sulfur source, unexpected increases in polymer I.V. and yield are shown.

TABLE 1

Effect of 4-Aminobutyric Acid on PPSS Polymerization

| Polymer | 4-ABA[a], mole | NaOH, moles | I.V., dL/g | Yield % | I.V. After Zinc Wash, dL/g |
|---|---|---|---|---|---|
| 1 | 0 | 1.0 | 0.41, 0.40 | 90 | 0.39 |
| 2 | 0.005 | 1.005 | 0.48 | 92 | 0.43 |
| 3 | 0.01 | 1.01 | 0.53 | 95 | 0.40, 0.49 |
| 4 | 0.02 | 1.02 | 0.55 | 93 | 0.50 |
| 5 | 0.02 | 1.02 | 0.56 | 93 | 0.51 |
| 6 | 0.05 | 1.05 | 0.43 | 83 | 0.38 |
| 7 | 0.05 | 1.05 | 0.36 | 81 | 0.34 |
| 8 | 0.10 | 1.10 | 0.30 | 22 | b |
| 9 | 0.20 | 1.20 | 0.12 | 0 | b |

[a]4-ABA = 4-aminobutyric acid
[b]Not treated with zinc acetate

EXAMPLE III

This example demonstrates the use of 2-pyrrolidone, a lactam, in PPSS polymerizations. The procedure was the same as described in Example I except for the addition of 2-pyrrolidone to the polymerization mixture charge and an increase in base level to provide one mole of base after the neutralization reaction of base with the lactam. In polymerization run 10, only 5 g of zinc acetate was used in the treatment of the polymer instead of the 10 g used in the other treatments.

The results of the polymerizations are shown in TABLE II and compared with Polymer 1, the control described in Example I. The presence of 2-pyrrolidone in the invention PPSS polymerization runs 10 and 11 results in higher yields and I.V. values for Polymers 11 and 12 as compared with the yield and I.V. value for Polymer 1.

TABLE 2

Effect of 2-Pyrrolidone on PPSS Polymerization

| Polymer | 2-Pyrrolidone moles | NaOH moles | I.V., dL/g | Yield % | I.V. After Zinc Wash dL/g |
|---|---|---|---|---|---|
| 1 | 0 | 1.0 | 0.41, 0.40 | 91 | 0.39 |
| 10 | 0.01 | 1.01 | 0.53 | 92 | 0.46 |
| 11 | 0.02 | 1.02 | 0.51 | 92 | 0.44 |

That which is claimed is:

1. A process to produce aromatic sulfide/sulfone polymers which comprises forming a polymerization mixture comprising:
   (a) at least one dihaloaromatic sulfone;
   (b) at least one organic amide;
   (c) at least one sulfur-containing compound selected from the group consisting of alkali metal sulfides and alkali metal hydrosulfides;
   (d) at least one salt of an amino carboxylic acid, wherein said salt of an amino carboxylic acid is present in an amount having a molar ratio of said salt of an amino carboxylic acid to said sulfur containing compound from about 0.001:1 to about 0.04:1; and (e) water, and subjecting said polymerization mixture to polymerization conditions sufficient to produce an aromatic sulfide/sulfone polymer.

2. A process according to claim 1 wherein (a) said dihaloaromatic sulfone is represented by the formula

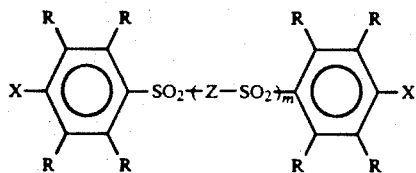

where X is selected from the group consisting of fluorine, chlorine, bromine, or iodine; Z is a divalent radical selected from the group consisting of

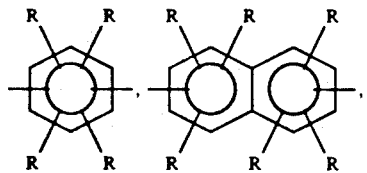

and

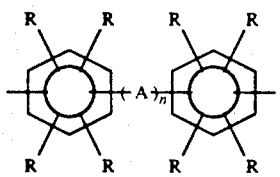

m is 0 or 1, n is 0 or 1, A is selected from the group consisting of oxygen, sulfur, sulfonyl, or $CR_2$, and each R is selected from the group consisting of hydrogen or alkyl radicals having 1 to about 4 carbon atoms, the total number of carbon atoms in all of the R groups in the molecule being 0 to about 12;

(b) said organic amide is selected from the group consisting of cyclic and acyclic organic amides having 1 to about 10 carbon atoms per molecule;

(c) said sulfur-containing compound is selected from the group consisting of alkali metal sulfides or hydrosulfides;

(d) said salt of an amino carboxylic acid is introduced into said reaction mixture as a salt represented by the formula $H_2N—R'—CO_2—X'$ wherein R' is a cyclic or an alicyclic alkylidene having 1 to 21 carbon atoms and X' is selected from the group consisting of lithium, sodium, potassium, rubidium, or cesium.

3. A process according to claim 2 wherein said m in said dihaloaromatic formula is 0 and said dihaloaromatic sulfone is represented by the formula:

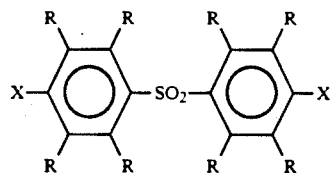

and said amino carboxylic acid component of said salt is selected from the group consisting of 2-aminoacetic acid, 3-aminopropionic acid, 4-aminobutyric acid, 3-aminobutyric acid, 6-aminohexanoic acid, 12-aminododecanoic acid, 8-aminododecanoic acid, 16-aminopalmitic acid, 18-aminostearic acid, 4-aminocyclohexanecarboxylic acid, 3-aminocyclohexadecanecarboxylic acid, or mixtures thereof.

4. A process according to claim 3 wherein said dihaloaromatic sulfone is bis(p-chlorophenyl) sulfone; said organic amide is N-methyl-2-pyrrolidone; said sulfur-containing compound is sodium hydrosulfide; said aromatic sulfide/sulfone polymer is poly(phenylene sulfide/sulfone); and said salt of an amino carboxylic acid is sodium 4-aminobuturate.

5. A process according to claim 2 wherein said dihaloaromatic sulfone is present in a molar ratio of said dihaloaromatic sulfone to said sulfur-containing compound within the range from about 0.7:1 to about 1.3:1; said organic amide is present in a molar ratio of said organic amide to said sulfur-containing compound within the range from about 2:1 to about 24:1; said water is present in a molar ratio of said organic amide to said water within a range from about 0.4:1 to about 1.3:1; and said salt of an amino carboxylic acid is present in the molar ratio of said salt of an amino carboxylic acid to sulfur containing compound from 0.004:1 to 0.03:1.

6. A process according to claim 5 wherein the molar ratio of salt of an amino carboxylic acid to sulfur containing compound is from 0.008:1 to 0.03:1.

7. A process according to claim 1 wherein (a) said dihaloaromatic sulfone is represented by the formula

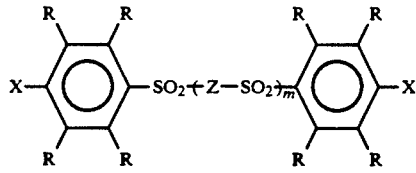

where X is selected from the group consisting of fluorine, chlorine, bromine, or iodine; Z is a divalent radical selected from the group consisting of

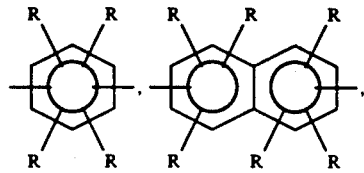

and

-continued

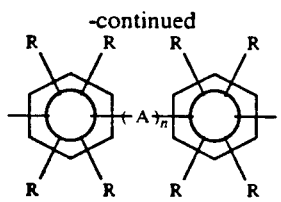

m is 0 or 1, n is 0 or 1, A is selected from the group consisting of oxygen, sulfur, sulfonyl, or $CR_2$, and each R is selected from the group consisting of hydrogen or alkyl radicals having 1 to about 4 carbon atoms, the total number of carbon atoms in all of the R groups in the molecule being 0 to about 12;

(b) said organic amide is selected from the group consisting of cyclic and acyclic organic amides having 1 to about 10 carbon atoms per molecule;

(c) said sulfur-containing compound is selected from the group consisting of alkali metal sulfides or hydrosulfides;

(d) said salt of an amino carboxylic acid is formed in situ by contacting an amino carboxylic acid with a base in said polymerization reaction mixture, wherein said amino carboxylic acid is present in a molar ratio of amino carboxylic acid to sulfur containing compound from about 0.001:1 to about 0.04:1; said amino carboxylic acid is represented by the formula $H_2N—R'—CO_2H$ where R' is a cyclic or acyclic alkylidene having from 1 to 21 carbon atoms; said base is selected from the group consisting of an alkali metal hydroxide, alkali metal carbonate, and mixtures thereof; and said polymerization mixture has a total base content within a molar range of base to sulfur-containing compound from about 0.5:1 to about 2:1.

8. A process according to claim 7 wherein said m in said dihaloaromatic formula is 0 and said dihaloaromatic sulfone is represented by the formula:

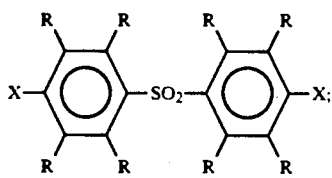

said amino carboxylic acid is selected from the group consisting of 2-aminoacetic acid, 3-aminopropionic acid, 4-aminobutyric acid, 3-aminobutyric acid, 6-aminohexanoic acid, 1,2-aminododecanoic acid, 8-aminododecanoic acid, 16-aminopalmitic acid, 18-aminostearic acid, 4-aminocyclohexanecarboxylic acid, 3-aminocyclohexadecanecarboxylic acid, or mixtures thereof; and said base is selected from the group consisting of sodium hydroxide, sodium carbonate, or a mixture thereof.

9. A process according to claim 8 wherein said dihaloaromatic sulfone is bis(p-chlorophenyl) sulfone; said organic amide is N-methyl-2-pyrrolidone; said sulfur-containing compound is sodium hydrosulfide; said aromatic sulfide/sulfone polymer is poly(phenylene sulfide/sulfone); said amino carboxylic acid is 4-aminobutyric acid; and said base is sodium hydroxide.

10. A process according to claim 7 wherein said dihaloaromatic sulfone is present in a molar ratio of said dihaloaromatic sulfone to said sulfur-containing compound within a range from about 0.7:1 to about 1.3:1; said organic amide is present in a molar ratio of said organic amide to said sulfur-containing compound within a range from about 2:1 to about 24:1; said water is present in a molar ratio of said organic amide to said water within a range from about 0.4:1 to about 1.3:1; said amino carboxylic acid is present in the molar ratio of said amino carboxylic acid to sulfur containing compound from 0.004:1 to 0.03:1; and with said total base content in said polymerization mixture within a molar range of base to sulfur-containing compound from 0.75:1 to 1.25:1.

11. A process according to claim 10 wherein the molar ratio of said amino carboxylic acid to sulfur containing compound is from 0.008:1 to 0.03:1 and said molar ratio of base to sulfur-containing compound is from 0.9:1 to 1.1:1.

12. A process according to claim 1 wherein
(a) said dihaloaromatic sulfone is represented by the formula

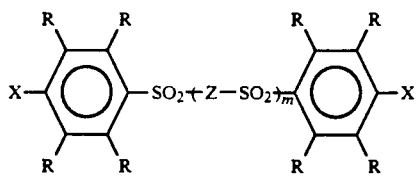

where X is selected from the group consisting of fluorine, chlorine, bromine, or iodine; Z is a divalent radical selected from the group consisting of

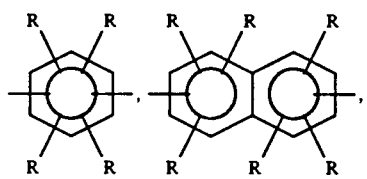

and

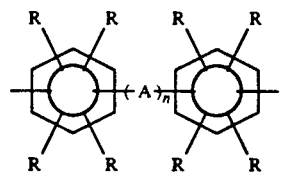

m is 0 or 1, n is 0 or 1, A is selected from the group consisting of oxygen, sulfur, sulfonyl, or $CR_2$, and each R is selected from the group consisting of hydrogen or alkyl radicals having 1 to about 4 carbon atoms, the total number of carbon atoms in all of the R groups in the molecule being 0 to about 12;

(b) said organic amide is selected from the group consisting of cyclic and acyclic organic amides having 1 to about 10 carbon atoms per molecule;

(c) said sulfur-containing compound is selected from the group consisting of alkali metal sulfides or hydrosulfides; and (d) said salt of an amino carboxylic acid is formed in situ by contacting a lactam with a base in said polymerization reaction mixture; with said lactam present in a molar ratio of amino carboxylic acid to sulfur-containing compound from about 0.001:1 to about 0.04:1; with said lactam represented by the formula:

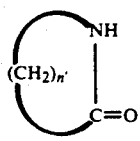

where n is from 1 to 10; said base is selected from the group consisting of an alkali metal hydroxide or a mixture of an alkali metal hydroxide and an alkali metal carbonate; and said polymerization mixture has a total base content with a molar range of base to sulfur-containing compound from about 0.5:1 to about 2:1.

13. A process according to claim 12 wherein said m in said dihaloaromatic formula is 0 and said dihaloaromatic sulfone is represented by the formula:

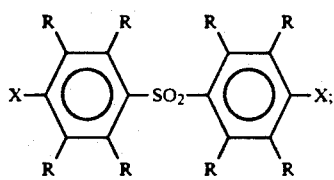

said lactam is selected from the group consisting of azacyclobutan-2-one, 2-pyrrolidone, ε-caprolactam, azacycloheptan-2-one, azacycloooctan-2-one, azacyclodecan-2-one, and mixtures thereof.

14. A process according to claim 13 wherein said base is a mixture of sodium hydroxide and sodium carbonate having a molar ratio of sodium hydroxide to sodium carbonate with a range from about 20:80 to about 99:1.

15. A process according to claim 14 wherein said molar ratio of sodium hydroxide to sodium carbonate is from 60:40 to 99:1.

16. A process according to claim 13 wherein said amino carboxylic acid is 2-pyrrolidone and said base is sodium hydroxide.

17. A process according to claim 13 wherein said dihaloaromatic sulfone is present in a molar ratio of said dihaloaromatic sulfone to said sulfur-containing compound with a range from about 0.7:1 to about 1.3:1; said organic amide is present in a molar ratio of said organic amide to said sulfur-containing compound within a range from about 2:1 to about 24:1; said water is present in a molar ratio of said organic amide to said water within a range from about 0.4:1 to about 1.3:1; said lactam is present in the molar ratio of said lactam to sulfur-containing compound from 0.004:1 to 0.3:1; and with said total base content in said polymerization mixture within a molar range of base to sulfur-containing compound from 0.75:1 to 1.25:1.

18. A process according to claim 17 wherein the molar ratio of said lactam to sulfur-containing compound is from 0.008 to 0.03 and said molar ratio of base to sulfur-containing compound is from 0.9:1 to 1.1:1.

* * * * *

UNITED STATES PATENT AND TRADEMARK OFFICE
CERTIFICATE OF CORRECTION

PATENT NO. : 5,134,224

DATED : July 28, 1992

INVENTOR(S) : Afif M. Nesheiwat et al

It is certified that error appears in the above-identified patent and that said Letters Patent is hereby corrected as shown below:

Col. 14, claim 17, line 23, delete "0.3:1" and insert --- 0.03:1 ---.

Signed and Sealed this

Sixteenth Day of November, 1993

*Attest:*

BRUCE LEHMAN

*Attesting Officer*     Commissioner of Patents and Trademarks